United States Patent [19]
Harris

[11] Patent Number: 5,823,176
[45] Date of Patent: Oct. 20, 1998

[54] SOLAR WATER HEATING PANEL ATTACHMENT DEVICE

[76] Inventor: Don Harris, 25122 Barclay La., Laguna Niguel, Calif. 92677

[21] Appl. No.: 966,860

[22] Filed: Nov. 10, 1997

[51] Int. Cl.⁶ .................................................... F24J 2/36
[52] U.S. Cl. .......................... 126/624; 126/626; 126/665; 165/46
[58] Field of Search ..................... 126/624, 626, 126/665; 165/46

[56] References Cited

U.S. PATENT DOCUMENTS 4,823,771  4/1989  Menning .................................. 126/624

FOREIGN PATENT DOCUMENTS 56-42054  4/1981  Japan ...................................... 126/626

*Primary Examiner*—Carroll B. Dority
*Attorney, Agent, or Firm*—Gary Appel

[57] ABSTRACT

A flexible tie-down device is provided for attaching a swimming pool-type solar water panel to a roof or other structure. The device is adapted for use with a solar panel having at least one elongate solar panel array formed of a number of side-by-side connected, small diameter, flexible elastomeric, heat transfer tubes, which are attached in fluid flow relationship at one end to a rigid, larger diameter tubular, unheated water inlet manifold and at the other end to a rigid, larger diameter tubular heated water outlet manifold. The tie-down device comprises a plurality of flexible elastromeric tubes connected in a side-by-side relationship to form a device array, the tubes having a length enabling the device array to bend around the outside of either of the inlet and outlet manifolds with the end regions of the device extending outwardly in a parallel, overlapping relationship relative to one another. A lag screw is provided for passing through a retainer clip and the overlapping end regions of the device array and for extending into an existing roof structure. The tie-down device is sized so that when the device is installed around either of the inlet and outlet manifolds and is attached to an existing structure, the manifold is permitted to move sideways in the device a distance equal to at least about the radius of the manifold. Preferably, the tubes forming the device array are the same as the tubes used in the solar panel array so that the device array can expand and contract in unison with the solar array.

11 Claims, 5 Drawing Sheets

SOLAR WATER HEATING PANEL ATTACHMENT DEVICE

BACKGROUND OF THE INVENTION

1. Field of the Invention

The present invention relates generally to the field of solar water heating apparatus and systems, more particularly, to roof-mounted solar water heating panels, and still more particularly, to apparatus or devices for securing such solar panels to a building roof or the like.

2. Background Discussion

The use of solar panels for heating water, for such uses as heating the water for swimming pools or for domestic water heating, is well known in many regions of the world where sufficient sunlight exists to make solar water heating efficient and cost-effective. In fact, some localities, especially in southwestern regions of the United states, are believed to require the use of solar water heating for swimming pools in order to conserve electricity, or more accurately, to conserve fuel used to generate electricity.

Solar water heating systems utilize solar panels which are necessarily mounted where they are exposed to the sun for several hours a day—this requires that the solar panels are most often mounted on roofs of buildings where the panels are out of the way and are not shaded by trees or other buildings. Typical solar panels comprise a large number of relatively long, small diameter tubes, having a large surface to volume ratio, through which water to be heated is flowed.

Solar panels used for domestic water heating are typically constructed and installed to operate in conjunction with natural gas or electric water heaters. As such, a separate solar water heater tank is usually provided in addition to the gas or electric water heating tank. In hot, sunny weather the solar water heating system takes over and may provide all the domestic hot water required. On the other hand, in cold and/or cloudy weather, the gas or electric water heater takes over and provides the domestic hot water required. In in-between weather, the solar water heating system augments the gas or electric water heater and provides warm water which the gas or electric water heats to the required temperature.

The solar panels for domestic water heating are typically constructed for permanent installation with copper tubing enclosed in a metal frame. A reflective backing is usually provided behind the tubing for maximum heating efficiency of the tubing. A glass cover is usually provided for the frame to keep debris from collecting on the tubing and thereby reducing the heat transfer from the sun to the tubing array. Such solar panels are usually of standard sizes and, as mentioned, are intended for permanent installation, usually on roofs. If needed, more than one such standard solar panels may be connected in series or parallel.

Because the solar panels are of rigid construction, they may, if required, be mounted on a support structure at an angle to the roof selected to achieve optimum exposure to sunlight. This is particularly the type of solar panel installation used on buildings with flat or only slightly sloping roofs.

It can be appreciated that solar water heating systems used for heating domestic water must meet stringent building and health codes established for domestic (i.e., potable-water) water systems, and which usually dictate the permanent, and relatively high-cost, construction of domestic solar water heating systems and installations as described above.

In contrast, less stringent requirements are ordinarily applied to solar water heating systems used for heating non-potable swimming pool water. Consequently, less elaborate and costly, but usually less efficient, solar panels are typically installed for heating pool water.

Solar panels for heating pool water pools typically comprise lengths of small diameter, plastic tubing mounted in a close, side-by side relationship. The tubing is ordinarily constructed from black polyvinyl chloride (PVC) or other black elastomeric materials, and may be fabricated in rolls or sheets of about 18 side-by-side, bonded together tubes, the rolls or sheets being readily cut by a sharp knife into desired or required lengths.

Each end of a length of one of these tubing arrays is attached to a rigid plastic manifold—a cool water inlet manifold provided at one end and a hot water outlet manifold provided at the other end of the array. Ends of each individual tube are forced onto projecting ends of small, tubular bayonet-type fittings installed through side walls of the inlet and outlet manifolds.

For most solar water-heating systems for heating swimming pool water, several of the tubing arrays are installed in side-by-side relationship between a single inlet manifold and a single outlet manifold.

Upon completion of this type of solar panel, the inlet and outlet manifold tubes are typically fastened to the roof structure, such as underlying rafters, by conventional, pre-formed tubing clamps or clamps formed on site from short lengths of conventional plumbers' strapping tape. Intermediate the end manifolds, parallel arrays of tubing may be fastened to the roof by lengths of flexible material that is woven over and under the tubing arrays or by an adhesive bonding material to keep the arrays from sagging on slopping roofs.

Using this method of assembly of solar pool water heating panels, the construction of the panels is rapid and inexpensive, and requires minimal experience, particularly since no soldering is required to attach ends of the tubing to the inlet and outlet manifolds. Moreover, this method of construction enables the solar panels to be assembled on site to lengths determined by pool size, sun exposure and other factors. Still further, an expensive and space-requiring inventory of different sizes of pre-fabricated solar panels (of the type typically used for heating domestic water) is not required.

Nevertheless, some water leakage problems have been found to be relatively common to the above-described swimming pool-type, plastic tubing solar water heating systems. This water leakage problem is typically the pulling loose of some of the plastic tubes from the bayonet-type fittings installed on the inlet and/or outlet manifolds onto which ends of the tubes are force-fit. Since the inlet and outlet water manifold tubes are tightly fastened down, buckling of the tubing arrays caused by high solar heating—especially when no water is flowing through the tubing arrays-can cause enough softening of the tubing and create sufficient forces to pull the tubing off their attachment fittings. Contraction of the tubing in severe cold weather can likewise cause pulling loose of the tubing from one or both manifolds.

In order to prevent contraction/expansion problems with the tubing arrays from the inlet and/or outlet manifolds, the present inventor has invented a new hold-down attachment device for securing the inlet and outlet manifolds used in solar water panels of the type most commonly used for heating water for swimming pool use.

SUMMARY OF THE INVENTION

In accordance with the present invention, there is provided a flexible tie-down device for attaching to a roof a solar water panel of a type used for heating water for swimming pools. The solar panel has two or more elongate solar panel arrays each being formed of a number of side-by-side, small diameter, flexible plastic, heat transfer tubes which are attached in water flow relationship at one end to a rigid, larger diameter tubular water inlet manifold and at the other end to a rigid, larger diameter tubular water outlet manifold.

The attachment device according to the present invention comprises a plurality of flexible plastic tubes connected in a side-by-side relationship to form a device array of the tubes. The device array has a length enabling it to bend and fit loosely around the outside of either of said tubular inlet and outlet manifolds with the end regions of the device extending outwardly in a parallel, overlapping relationship relative to one another. Included are means for enabling the overlapped end regions of the device array to be attached to a preexisting structure, such as a roof rafter.

Preferably, the tubes forming the device array are formed of the same material and of the same size as the tubes forming the solar panel array and has the same coefficient of thermal expansion. Also preferably, the tubes forming the device array have an outside diameter of about 0.333 inches.

For inlet and outlet manifolds being formed of an elastomeric tubing having an outside diameter of about two inches. The plurality of tubes forming the device array have an overall length of about 16 inches so that when the device is installed around either the inlet or outlet manifold and is attached by the attaching means to an existing structure, the inlet or outlet manifold is permitted to move about sideways in said device a distance equal to at least about the radius of the manifolds.

The solar panel attachment devices of the present invention accommodate thermal expansion of the tubing forming the solar panel arrays and thereby prevent stresses which cause the solar panel array tubing from pulling loose from push-on fittings permanently installed through a side wall of the inlet and outlet manifolds.

BRIEF DESCRIPTION OF THE DRAWINGS

The present invention can be more readily understood by a consideration of the following detailed description when taken in conjunction with the accompanying drawings, in which.

In the various FIGS., the same elements and features are given the same reference numbers.

DESCRIPTION OF THE PREFERRED EMBODIMENT

Figure 1:
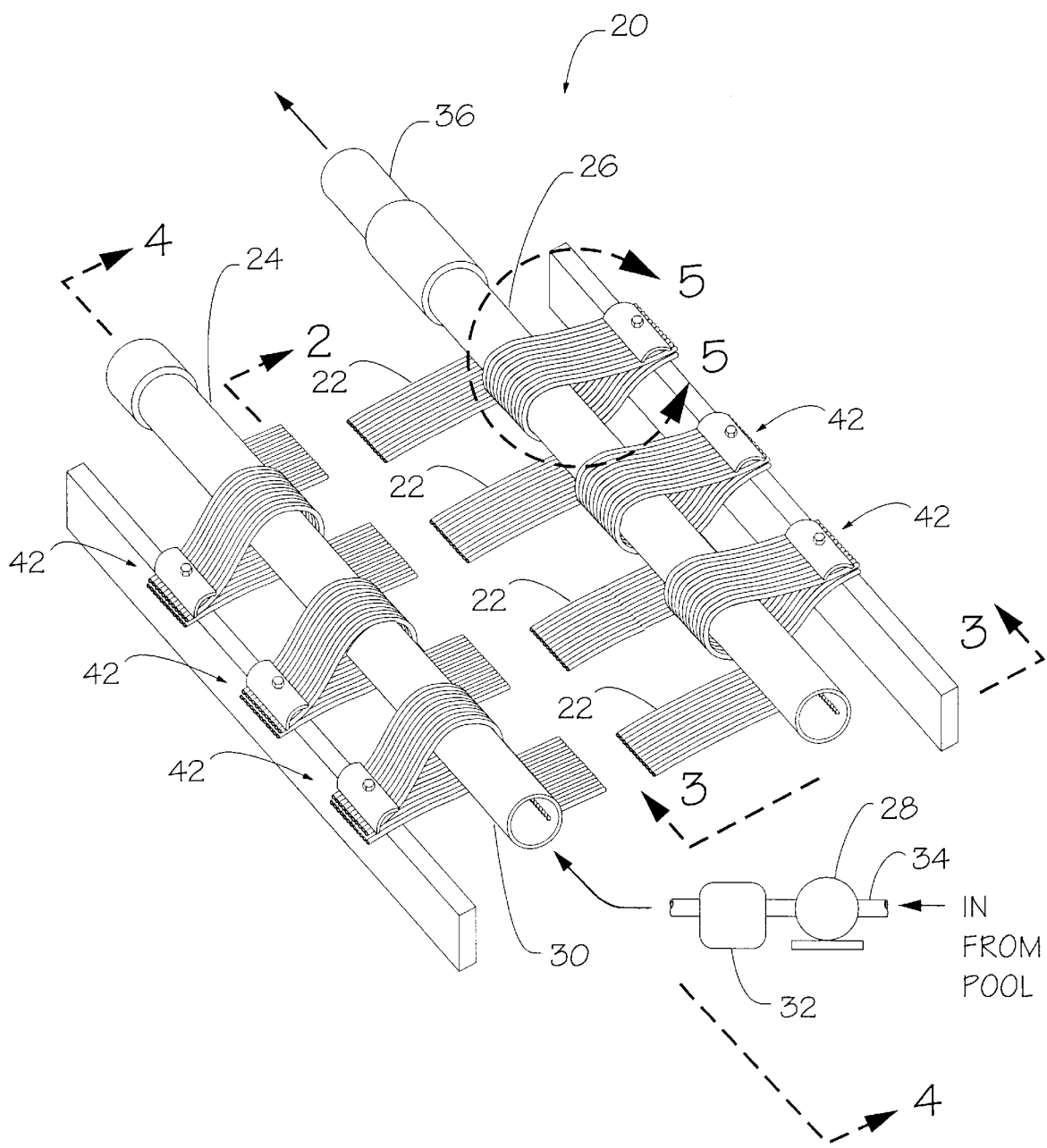
FIG. 1 is a perspective drawing of an exemplary, modular-type solar water heating panel system, showing, by way of illustration, an assembly of four elongate sub-panels constructed of a number of interconnected small diameter elongate tubes fastened at each end to a tubular manifold, and showing the cool water inlet and hot water outlet manifolds fastened down to existing roof structure with a number (six being shown) of flexible mounting and installation devices in accordance with the present invention.

There is shown in perspective in FIG. 1 a representative solar water heating panel assembly 20 of the type typically used for heating water for swimming pool use. Generally comprising solar water panel assembly 20 are a number—four being shown-of flat, elongate black plastic tubing arrays 22. These tubing arrays 22 are connected, in a side-by-side relationship, between a cool water inlet manifold 24 and a hot water outlet manifold 26. Unheated water is fed, by a water pump 28, through a water inlet conduit 30 and a filter 32, to which water is drawn, through a conduit 32 from a swimming pool (not shown). Heated water is flowed from outlet manifold 26, through a water conduit 34, to the swimming pool.

Shown attaching solar panel assembly 20 to a roof 40 are a number—six being shown by way of illustrative example-of mounting and installation attachment devices 42 in accordance with the present invention. As shown in FIG. 1, and as more particularly described below, attachment or tie down devices 42 are installed around unheated water inlet manifold 24 and heated water outlet manifold 26 at manifold connections. In addition, devices 42 may be installed in the same way around end regions of manifolds 24 and 26 if desire or if needed.

Figure 2:
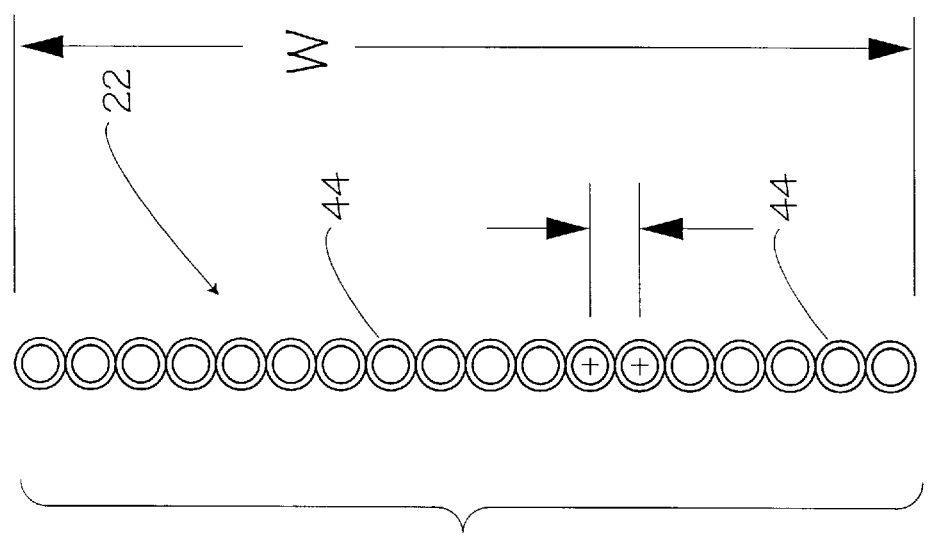
FIG. 2 is a transverse cross sectional drawing looking along line 2—2 of FIG. 1, a prior art, in-line array of 18 small diameter plastic water-carrying tubes associated with a representative one of the tubing arrays, and showing the tubes bonded or otherwise joined together to form a substantially flat structure.

As depicted in FIG. 2 for a representative one of the tubing arrays 22, each array is formed of a number of side-by-side, heat transfer tubes 44 through which water is flowed and which are formed from a black, heat-absorbing and ultraviolet light resistant plastic material, such as EPDM, typically having an outside diameter of 0.333 inches and an inner diameter of about 0.190 inches. A typical tubing array 22 is formed, for example, by an extrusion process, to have 18 tubes 44 with a total width, W, of about 6 inches.

Inlet and outlet manifolds 26 and 26, both of which are similarly constructed so as to be interchangeable when constructed in advance of installation of system 20, are typically and preferably constructed of 2 inch outside diameter, schedule 80 PVC tubing.

Figure 3:
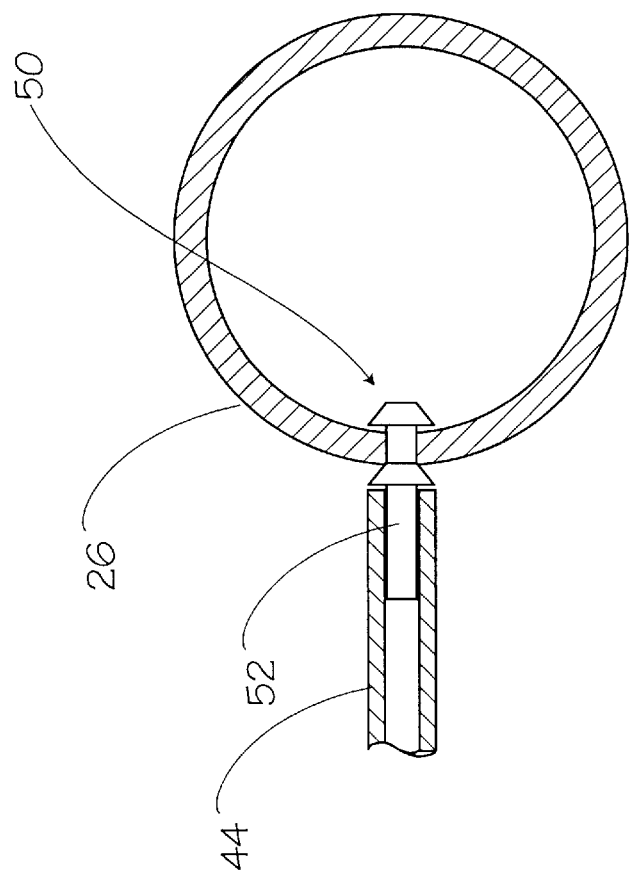
FIG. 3 is a transverse cross sectional drawing looking along line 3—3 of FIG. 1, and showing a representative, prior art connection of one end of one of the tubes forced over a projecting end of a tubular, bayonet type fitting which is installed through the outlet manifold tube.

As shown in FIG. 3, hollow bayonet-type fittings 50 are installed through the side wall of the manifolds (representative manifold 26 being depicted in FIG. 3) and are cemented (glued) in place. Fittings 50 are spaced longitudinally along the manifolds 24 and 26 at spaces the same as the center-to-center spacing, S, between tubes 44 of array 22 (FIG. 2). Ends of tubes 44 are force fit onto projecting end regions 52 of fittings 50 to provide a water-tight connection between tubing arrays 22 and manifolds 24 and 26.

Figure 4:
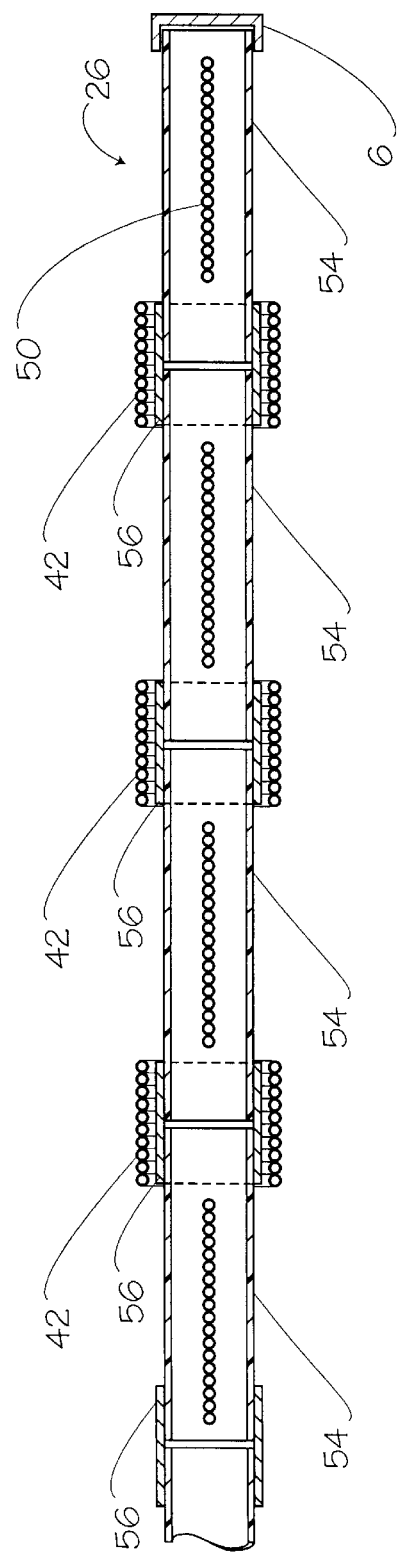
FIG. 4 is a longitudinal cross sectional drawing looking along line 4—4 of FIG. 1, showing the interconnection of four sections of the outlet manifold, showing inner ends of the bayonet type tubing attachment fittings and further showing, in cross section, the manifold securing devices of the present invention.

As shown in FIG. 4 for representative water outlet manifold 54, the manifold is constructed of individual segments or sections 54 of 2 inch O.D. PVC tubing, each having a length, L, of about 8 inches. For system 20 depicted in FIG. 1 and having four tubing arrays 22, four tubing sections 54 are used, with three 2 inch I.D. couplings 56 being used to join the four tubing sections together in a conventional manner. Another coupling 56 is used to connect a proximal end of manifold 26 to inlet conduit 30 and a 2 inch end cap 56 is installed at the distal end of the manifold to close it off. It is, however, to be understood that solar panel 20 may comprise more or fewer than the four interconnected tubing arrays 22 (including manifold segments 54 at each end) depicted in FIG. 1.

Figure 5:
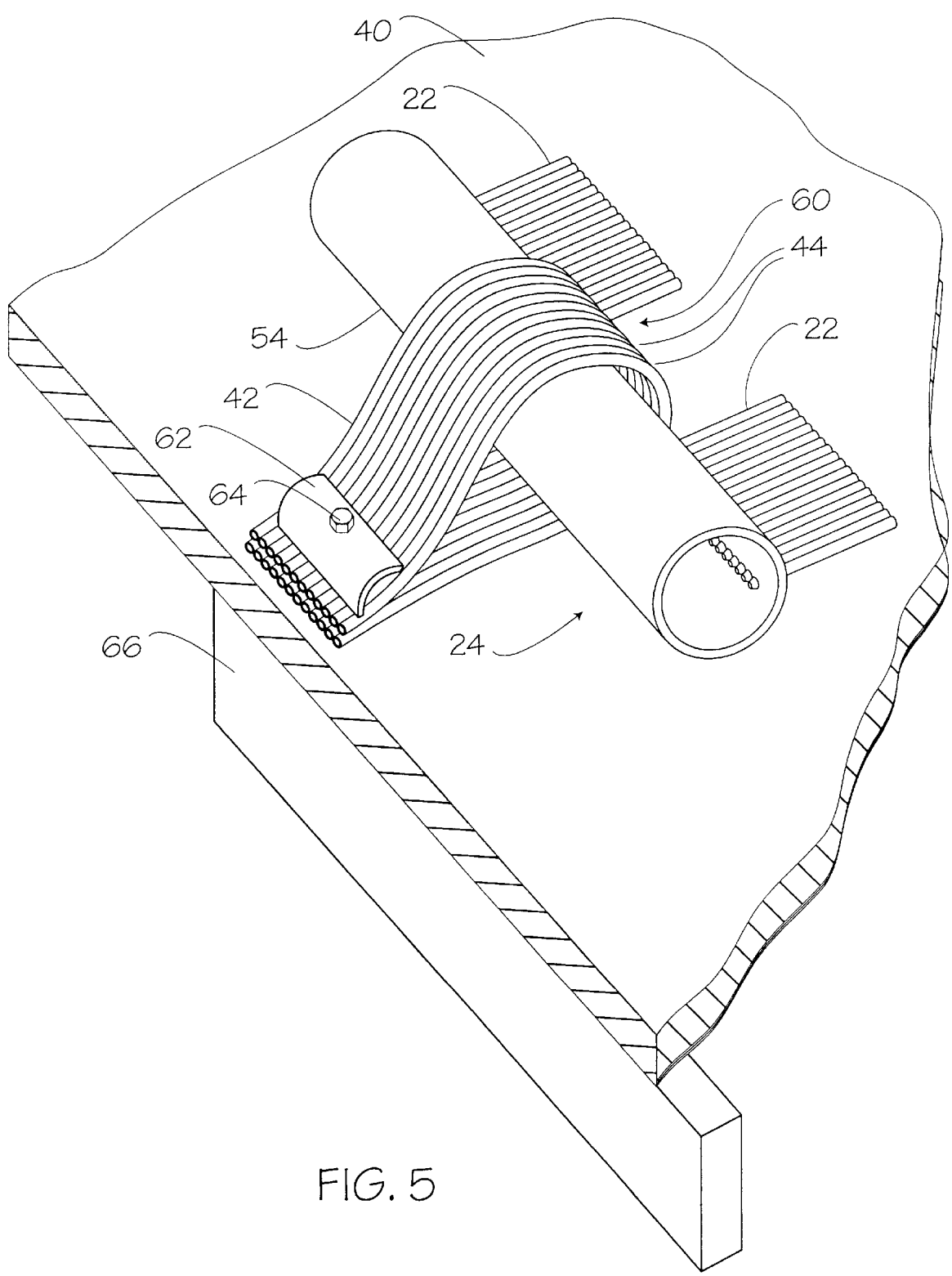
FIG. 5 is a perspective drawing of a representative one of the attachment fittings of the present invention, showing its construction from a length of a number of side-by-side tubes of the same type used in the tubing arrays.
Figure 6:
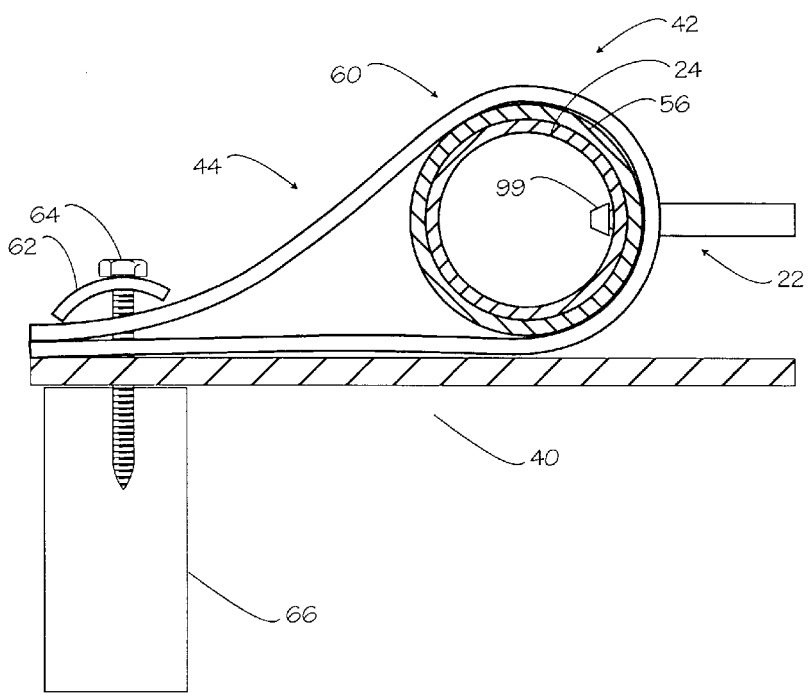
FIG. 6 is a transverse cross sectional drawing looking along line 6—6 of FIG. 5 showing the manner in which the attachment fitting is looped loosely around a connection region of the water inlet manifold and the manner in which the attachment fitting is secured to existing roof structure.

A representative one of solar panel attachment devices 42 is depicted in FIGS. 5 and 6. As shown, device 42 comprises a suitable length of an array 60 of the same tubing material as used in the construction of panel arrays 22. According to the dimensions of arrays 22, the device array 60 may comprise from about 2 to as many as 18 of tubes 44, which, as described above, are joined in side-by-side relationship. As an illustration, with no limitation being thereby intended or implied, for a 2 inch O.D. manifold 24 (and 26), array 42 advantageously comprises about ten tubes 44 with a width, w, of about 3-¼ inches, and has an overall length of about 16 inches when flattened out, the length being sufficient to permit sideways movement of manifold 24 by about the radius of the manifold-or about one inch for a two inch diameter manifold.

A mounting clip 62, which may advantageously comprise a quarter section of a 2 inch O.D. schedule 80 tube—the same as used for manifold sections 54—is used to clamp overlapping end regions of device 44 to roof 40 (or the like). In such instance, a lag screw 64 passes through clip 62 through both end regions of array 60, through roof 40 and into an existing internal structure, for example, a 2×6 inch or a 2×8 inch rafter 66, that supports the roof.

As best seen from FIG. 6, device tubing array 60 is wrapped or fit around manifold 24 (before being attached by lag screw 64 to roof structure 66) in a manner permitting limited fore and aft (i.e., longitudinal) expansion/contraction movement (in the direction of arrows "A" and "A") of the tubes 44 comprising solar panel array 22. Very importantly, since device array 60 is constructed of pieces of the same tubes 44 used in solar panel array 22, the device array expands in length as the length of the panel array expands, thereby providing for additional limited fore-aft expansion movement of the panel array.

Figure 8:
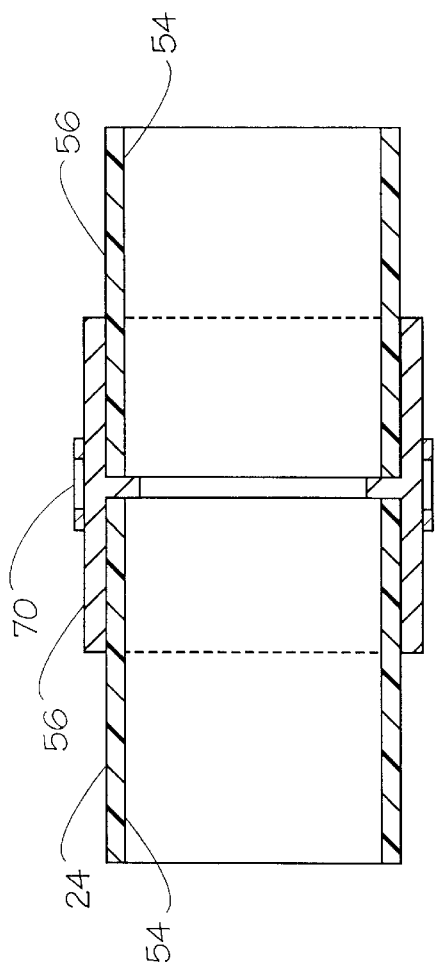
FIG. 8 is a transverse cross sectional drawing looking along line 8—8 of FIG. 7, showing features of the prior art manifold clamp.

As a result of the above-described construction of attachment devices 42 (which can be conveniently constructed on site or can be prefabricated off site) when solar panel array 22 expands lengthwise due to heating, the tendency for tubes 44 to pull out of bayonet-type fittings 50 is eliminated or at least greatly reduced over the situation when metal clamps 70 (FIGS. 7 and 8) have heretofore been used to tie down manifolds 24 and 24.

Such prior art clamps 70, typically constructed on site from sections of conventional metal plumbers strapping having relatively closely-spaced attachment holes 72, are formed by the strapping being bent or wrapped closely around manifold couplings 56. Overlapping ends of clamps 70 formed in this manner are secured to underlying roof structure 66 by lag screws 64.

Figure 7:
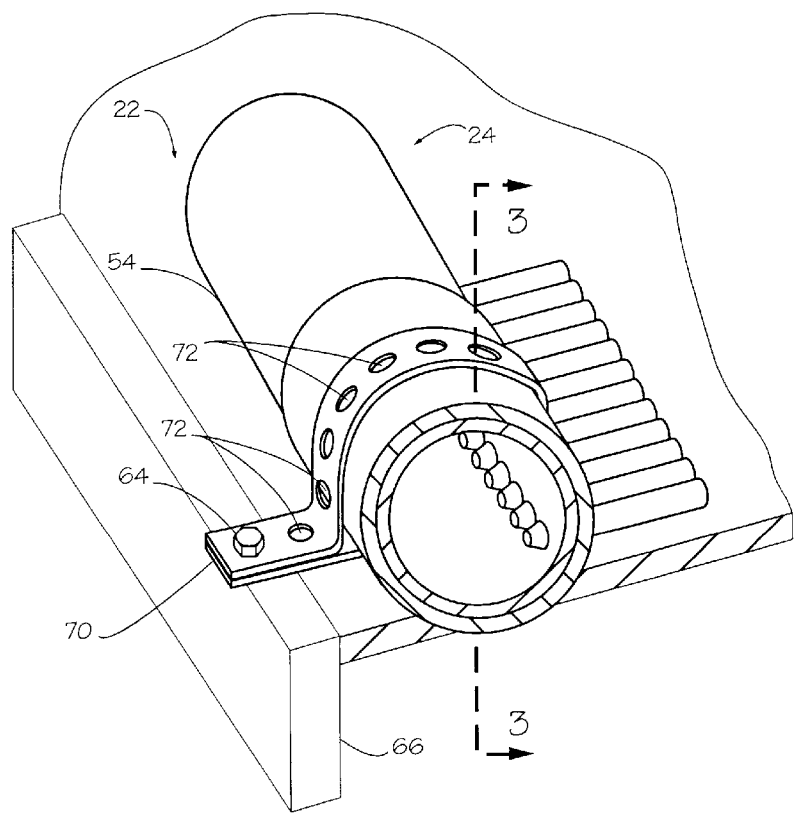
FIG. 7 is a perspective drawing similar to FIG. 5, but showing, by way of comparison, an existing, prior art camp constructed from plumbers' strapping tape which is commonly used to fasten the inlet and outlet manifolds of swimming pool-type solar water heating panels to existing roof structure.

Although such metal clamps 70 are effective in tying down solar panel manifolds 24 and 26, as can be seen from FIG. 7 they do not provide for or accommodate the longitudinal expansion or contraction of solar panel arrays 22 as do devices 42 of the present invention.

Although there has been shown in the FIGS. and has been described above a flexible solar water heating panel apparatus or device and a corresponding solar water heating panel in accordance with the present invention for purposes of illustrating the manner in which the present invention maybe used to advantage, it is to be understood that the invention is not limited thereto. Consequently, any and all variations and equivalent arrangements which may occur to those skilled in the applicable art are to be considered to be within the scope and spirit of the invention as set forth in the claims which are appended hereto as part of this application.

What is claimed is:

1. A flexible tie-down device for attaching to a roof a solar water panel of a type used for heating water for swimming pools, the solar panel having two or more elongate solar panel arrays each being formed of a number of side-by-side, small diameter, flexible plastic heat transfer tubes attached at one end to a rigid, larger diameter elongate tubular water inlet manifold and at the other end to a rigid, larger diameter elongate tubular water outlet manifold, said tie-down device comprising;

a. a plurality of flexible elastometric tubes connected in a side-by-side relationship to form a device array of said tubes having a length enabling the device array to bend and fit around the outside of either of said tubular inlet and outlet manifolds with the end regions of the device extending outwardly in a parallel, overlapping relationship relative to one another; and b. means for enabling said overlapped end regions of said device array to a preexisting structure.

2. The solar panel tie-down device as claimed in claim 1, wherein said tubes forming the device array are formed of the same material and of the same size as the tubes forming the solar panel array.

3. The solar panel tie-down device as claimed in claim 1, wherein the solar panel inlet and outlet manifolds are formed of a rigid plastic tubing having an outside diameter of about two inches and wherein said plurality of tubes forming the device array have an overall length of about 16 inches.

4. The solar panel tie-down device as claimed in claim 3, wherein said tubes forming the device array have an outside diameter of about 0.333 inches.

5. The solar panel tie-down device as claimed in claim 2, wherein said tie-down device is sized so that when the device is installed around either of the inlet and outlet manifolds and is attached by said attaching means to an existing structure, said either of the inlet and outlet manifolds is permitted to move about sideways in said device a distance of at least about the radius of said manifolds.

6. A flexible tie-down device for attaching to a roof a solar water panel of a type used for heating water for swimming pools, the solar panel having two or more elongate solar panel arrays each being formed of a number of side-by-side, small diameter, flexible plastic tubes attached at one end to a rigid, larger diameter elongate tubular water inlet manifold and at the other end to a rigid, larger diameter elongate tubular water outlet manifold, said tie-down device comprising;

a. a plurality of flexible elastomeric tubes connected in a side-by-side relationship to form a device array of said tubes, said device array tubes being formed of the same material and of the same size as the tubes forming the solar panel array, and having a length enabling the device array to bend and fit around the outside of either of said tubular inlet and outlet manifolds with the end regions of the device extending outwardly in a parallel, overlapping relationship relative to one another; and b. means for enabling said overlapped end regions of said device array to a preexisting structure.

7. The solar panel tie-down device as claimed in claim 6, wherein the solar panel inlet and outlet manifolds are formed of a rigid plastic tubing having an outside diameter of about two inches and wherein said plurality of tubes forming the device array have an overall length of about 16 inches and being sized so that when the device is installed around either of the inlet and outlet manifolds and is attached by said attaching means to an existing structure, said either of the inlet and outlet manifolds is permitted to move about sideways in said device a distance of at least about the radius of said manifolds.

8. The solar panel tie-down device as claimed in claim 6, wherein said tubes forming the device array have an outside diameter of about 0.333 inches.

9. A flexible tie-down device for attaching to a roof a solar water panel of a type used for heating water for swimming pools, the solar panel having two or more elongate solar panel arrays each being formed of a number of side-by-side, small diameter, flexible plastic heat transfer tubes attached at one end to a rigid, larger diameter elongate tubular water inlet manifold and at the other end to a rigid, larger diameter elongate tubular water outlet manifold, said tie-down device comprising:

a. plurality of flexible elastomoeric tubes connected in a side-by-side relationship to form a device array of said tubes having a length enabling the device array to bend and fit around the outside of either of said tubular inlet and outlet manifolds with the end regions of the device extending outwardly in a parallel, overlapping relationship relative to one another; and b. means for enabling said overlapped end regions of said device array to a preexisting structure, the length of the device array being sufficient such that when the device is installed around either of the inlet and outlet manifolds and is attached by said attaching means to an existing structure, said either of the inlet and outlet manifolds is permitted to move about sideways in said device a distance of at least about the radius of said manifolds.

10. The solar panel tie-down device as claimed in claim 9, wherein said tubes forming the device array are formed of the same material and of the same size as the tubes forming the solar panel array, said tubes forming the device array having an outside diameter of about 0.333 inches.

11. The solar panel tie-down device as claimed in claim 9, wherein the solar panel inlet and outlet manifolds are formed of a rigid plastic tubing having an outside diameter of about two inches and wherein said plurality of tubes forming the device array have an overall length of about 16 inches.

* * * * *